United States Patent
Conrads et al.

(10) Patent No.: US 9,485,329 B1
(45) Date of Patent: Nov. 1, 2016

(54) ACTION-DEFINED CONDITIONS FOR SELECTING CURATED CONTENT

(71) Applicant: Google Inc., Mountain View, CA (US)

(72) Inventors: Alexandra Conrads, San Francisco, CA (US); Josh Sassoon, San Francisco, CA (US); Noam Lovinsky, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 547 days.

(21) Appl. No.: 13/944,769

(22) Filed: Jul. 17, 2013

(51) Int. Cl.
| | |
|---|---|
| *G06F 15/16* | (2006.01) |
| *H04L 29/06* | (2006.01) |
| *H04N 21/472* | (2011.01) |
| *H04L 29/08* | (2006.01) |
| *H04N 21/482* | (2011.01) |
| *H04N 21/6587* | (2011.01) |
| *H04N 21/422* | (2011.01) |

(52) U.S. Cl.
CPC ......... *H04L 67/42* (2013.01); *H04L 29/08198* (2013.01); *H04N 21/42204* (2013.01); *H04N 21/47217* (2013.01); *H04N 21/4825* (2013.01); *H04N 21/6587* (2013.01)

(58) Field of Classification Search
CPC ...................... H04L 67/2838; H04L 67/1014; H04L 29/08198; H04L 29/08729; H04L 67/42; H04N 21/42204; H04N 21/47217; H04N 21/4825; H04N 21/6587
USPC .......................................... 709/202–203, 250
See application file for complete search history.

(56) References Cited

U.S. PATENT DOCUMENTS

| | | | |
|---|---|---|---|
| 2011/0035264 A1* | 2/2011 | Zaloom ..................... 705/14.12 |
| 2012/0317085 A1* | 12/2012 | Green ............... G06F 17/30867 707/748 |
| 2013/0054351 A1* | 2/2013 | Krugman ............... G06Q 30/00 705/14.44 |
| 2013/0151948 A1* | 6/2013 | Khalil et al. .................. 715/234 |
| 2013/0325870 A1* | 12/2013 | Rouse ............... G06F 17/30707 707/741 |
| 2014/0006483 A1* | 1/2014 | Garmark ................. H04L 67/42 709/203 |

(Continued)

FOREIGN PATENT DOCUMENTS

WO    WO 2011/119775    9/2011

OTHER PUBLICATIONS

YouTube, Most Subscribed Channels, Sep. 3, 2006, captured via Wayback on Apr. 23, 2013 at http://web.archive.org/web/20060903035149/http://www.youtube.com/members?s=ms&t=a&g=0.

*Primary Examiner* — Bharat N Barot
(74) *Attorney, Agent, or Firm* — Lowenstein Sandler LLP

(57) ABSTRACT

The subject matter of this specification can be implemented in, among other things, a method that includes providing instructions to an administrative device for presenting an administrative interface. The administrative interface includes user input controls for selecting conditions for inclusion of content in a section of a user interface. The method includes receiving one or more selections of the user input controls. The selections include the conditions for inclusion of content in the section of the user interface. The conditions include types of actions requested by an account associated with the user interface. The method includes receiving a request for the user interface from a client device. The method includes selecting a subset of the content for inclusion in the section of the user interface based on the conditions and the type of action. The method includes providing instructions to the client device for presenting the user interface.

20 Claims, 4 Drawing Sheets

(56) References Cited

U.S. PATENT DOCUMENTS

| | | | |
|---|---|---|---|
| 2014/0108946 A1* | 4/2014 | Olofsson | 715/739 |
| 2014/0214927 A1* | 7/2014 | Garmark | H04N 21/47217 709/203 |
| 2014/0280079 A1* | 9/2014 | Jain | G06F 17/3053 707/723 |
| 2014/0358891 A1* | 12/2014 | Anstandig et al. | 707/710 |
| 2015/0142531 A1* | 5/2015 | Motamedi | G06F 3/04842 705/7.42 |

\* cited by examiner

ACTION-DEFINED CONDITIONS FOR SELECTING CURATED CONTENT

TECHNICAL FIELD

This specification relates to selecting curated content for inclusion in a particular section of a user interface based on action-defined conditions.

BACKGROUND

Many Internet sites allow a user to curate content on a page associated with the user or an organization. Some sites allow the user to upload content to be curated, such as images, audio, and/or video. For example the content may include movie clips or trailers for an account that promotes movies, music videos for an account associated with a musical artist, as well as amateur content such as video blogging, short original videos, and educational videos.

SUMMARY

In one aspect, a method includes providing instructions to an administrative device for presenting an administrative interface. The administrative interface includes user input controls for selecting conditions for inclusion of content in a section of a user-curated user interface. The method further includes receiving one or more selections of the user input controls from the administrative device. The selections include the conditions for inclusion of content in the section of the user-curated user interface. Each of the conditions includes at least one type of action requested by an account associated with the user-curated user interface. The method further includes receiving a request for the user-curated user interface from a client device. The method further includes selecting, at a server system, a subset of the content for inclusion in the section of the user-curated user interface based on the conditions and the type of action. The method further includes providing instructions to the client device for presenting the user-curated user interface. The user-curated user interface includes the subset of the content in the section of the user-curated user interface.

Implementations can include any, all, or none of the following features. Selecting the subset can be performed after receiving the request. Selecting the subset can be performed before receiving the request and after receiving an action performed on the content that is of the type in one of the conditions. The subset of the content can include a playlist of content and the type of action for one of the conditions can include adding content to the playlist. The subset of the content can include content with a particular tag and the type of action for one of the conditions can include tagging content with the particular tag. The subset of the content can include content uploaded to the account and the type of action for one of the conditions can include uploading content to the account. The action for a condition in the conditions can include multiple actions. The condition can apply a union of the actions. The condition can apply an intersection of the actions.

In one aspect, a non-transitory computer-readable medium having instructions stored thereon, which when executed by a processing device, cause the processing device to perform operations including providing instructions to an administrative device for presenting an administrative interface. The administrative interface includes user input controls for selecting conditions for inclusion of content in a section of a user-curated user interface. The operations further include receiving one or more selections of the user input controls from the administrative device. The selections include the conditions for inclusion of content in the section of the user-curated user interface. Each of the conditions includes at least one type of action requested by an account associated with the user-curated user interface. The operations further include receiving a request for the user-curated user interface from a client device. The operations further include selecting, at a server system, a subset of the content for inclusion in the section of the user-curated user interface based on the conditions and the type of action. The operations further include providing instructions to the client device for presenting the user-curated user interface. The user-curated user interface includes the subset of the content in the section of the user-curated user interface.

Implementations can include any, all, or none of the following features. Selecting the subset can be performed before receiving the request and after receiving an action performed on the content that is of the type in one of the conditions. The action for a condition in the conditions can include multiple actions. The condition can apply a union of the actions. The condition can apply an intersection of the actions.

In one aspect, a system includes at least one interface to receive one or more selections of user input controls from an administrative device. The selections include conditions for inclusion of content in a section of a user-curated user interface. Each of the conditions includes at least one type of action requested by an account associated with the user-curated user interface. The interface is further to receive a request for the user-curated user interface from a client device. The system further includes at least one processing device to provide an administrative interface for display at the administrative device. The administrative interface includes the user input controls. The processing device is further to select a subset of the content for inclusion in the section of the user-curated user interface based on the conditions and the type of action and to provide instructions to the client device for presenting the user-curated user interface. The user-curated user interface includes the subset of the content in the section of the user-curated user interface.

Implementations can include any, all, or none of the following features. The processing device can be further to select the subset after receipt of the request. The processing device can be further to select the subset before receipt of the request and after receipt of an action performed on the content that is of the type in one of the conditions. The subset of the content can include a playlist of content and the type of action for one of the conditions can include adding content to the playlist. The subset of the content can include content with a particular tag and the type of action for one of the conditions can include tagging content with the particular tag. The subset of the content can include content uploaded to the account and the type of action for one of the conditions can include uploading content to the account. The action for a condition in the conditions can include multiple actions. The condition can apply a union of the actions. The condition can apply an intersection of the actions.

The details of one or more implementations are set forth in the accompanying drawings and the description below. Other features and advantages will be apparent from the description and drawings, and from the claims.

DETAILED DESCRIPTION

Figure 1:
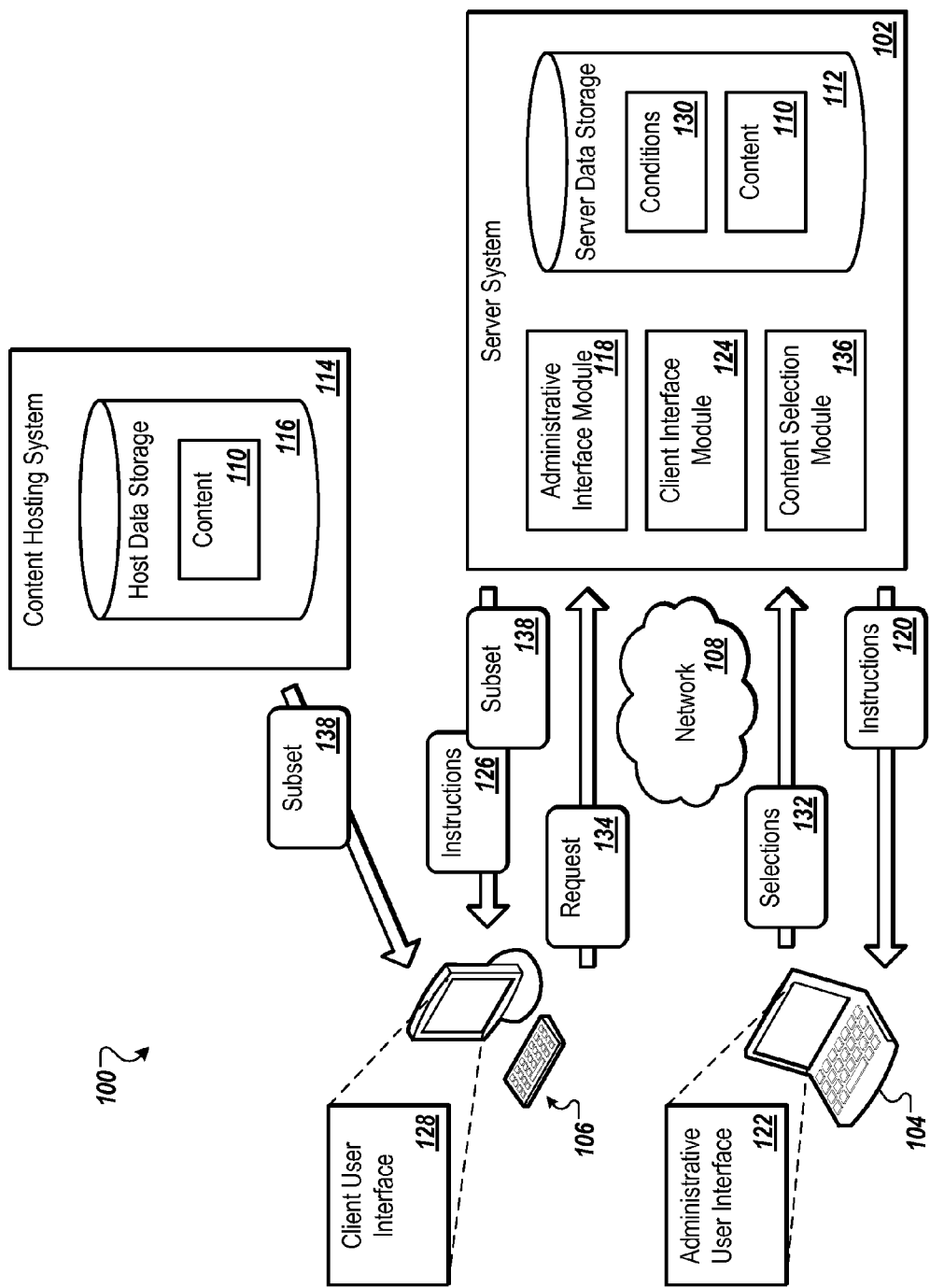
FIG. 1 is a schematic diagram that shows an example of a system for selecting curated content for inclusion in a particular section of a user interface based on action-defined conditions.

This document describes systems and techniques for selecting curated content for inclusion in a particular section of a user interface based on action-defined conditions. The content may be hosted by a server system that curates the content or by a separate hosting system. An administrator of a channel may manage curated content for the channel at the server system. The curated content may be uploaded by the administrator or by a user that manages another channel or account at the server system or the separate hosting system. The server system selects content for presentation in the channel based on action-defined conditions specified by the administrator of the channel. The actions include types of actions requested by the administrator (or other users) and performed by the system on content, such as liking content, tagging content, adding content to a playlist, posting comments, uploading content, and performing channel management operations.

The action-defined conditions specified by the administrator of the channel may include, for example, content that was liked by the administrator, content tagged by the administrator with a particular tag, content added to a particular playlist by the administrator, comments posted by the administrator, content uploaded by the administrator. In addition, multiple action-defined conditions may be combined using a union and/or intersection of the content that matches the individual action-defined conditions.

For example, content on a channel for a music pop star may have a mixture of official music tracks that belong to her albums, live footage from her concerts, and her top music tracks and interviews. In order to show viewers that she has all of these different groupings of content she may organize her content into by selecting curated content for inclusion in a particular section of the user interface for her channel based on action-defined conditions she specifies. She might have a section (colloquially referred to as a shelf) called "Albums." The album shelf may have an action-defined condition that includes a playlist for each album. As content is added to a playlist specified in the action-defined condition, that new content is automatically presented in that Album shelf to users that view the channel. Another shelf, called "Interviews," may include uploads that the pop star has tagged with an "Interviews" tag. As the pop star tags additional content with the "Interviews" tag, the content is automatically presented in the Interviews shelf to users that view the channel. Each of the shelves of content may have a large number of videos or playlists. In some implementations, a few are the items of content are displayed in the shelf and the shelf includes a link to the remaining items.

The systems and techniques described here may provide one or more of the following advantages. First, the systems and techniques may allow new content to be dynamically selected for presentation based on previously specified action-defined conditions. Second, the systems and techniques may allow content that was added after action-defined conditions are specified to be selected prior to receiving a request to present the content in a user interface.

FIG. 1 is a schematic diagram that shows an example of a system 100 for selecting curated content for inclusion in a particular section of a user interface based on action-defined conditions. The system 100 includes a server system 102 in communication with an administrative computing device 104 and a client computing device 106 over a network 108. The network 108 may include wireline and/or wireless networks. The network 108 may include a local network, a wide network, and/or one or more of the networking devices that form the Internet. The server system 102 provides channels of curated content. For example, a channel for a musical artist may include songs and videos curated from the artist's recordings and performances, or a channel for an educational organization may include lists of instructional videos for various topics curated from uploads of other users. The server system 102 selects content for presentation in a channel based on action-defined conditions, which may be specified by an administrator of the channel.

An administrator of a particular channel may upload a content 110 for the channel to the server system 102, such as from the administrative computing device 104. In addition, the administrator of the channel may link to the content 110 uploaded by another user, such as from the client computing device 106. The server system 102 may store the content 110 in a server data storage 112. In some implementations, the content 110 may be uploaded to a separate system, such as a content hosting system 114. The content hosting system 114 may store the content 110 in a host data storage 116. The server data storage 112 and the host data storage 116 may each include one or more storage devices. The server system 102 and the content hosting system 114 may each include one or more hardware processor devices.

The server system 102 also includes an administrative interface module 118 that provides one or more instructions 120 to the administrative computing device 104 for presenting an administrative user interface 122 at the administrative computing device 104. The server system 102 also includes a client interface module 124 that provides one or more instructions 126 to the client computing device 106 for presenting a client user interface 128 at the client computing device 106. In some implementations, the administrative computing device 104 and/or the client computing device 106 include a web browser application that processes markup language and scripting code in instructions from the server system 102, such as HyperText Markup Language (HTML), Cascading Style Sheets (CSS), Extensible Markup Language (XML), and/or JavaScript. The web browser application presents the processed markup and script using one or more output devices, such as a display device and/or an audio output device. The markup and script may direct the web browser application to present content, such as text, audio, and/or video. Alternatively, the administrative computing device 104 and/or the client computing device 106 may include a stand-alone application (e.g., a desktop application or a mobile application/app) rather than the web browser application for processing instructions from the server system 102.

The administrative computing device 104 receives and processes the instructions 120. In response, the administrative computing device 104 presents the administrative user interface 122. The administrative user interface 122 allows an administrative user to manage settings for a channel of curated content, such as one or more conditions 130 for inclusion of the content 110 in a particular section of the client user interface 128 to be presented to other non-administrative users. The administrative user interface 122 includes user input controls that allow the administrator to make one or more selections 132. Each of the selections 132 of the user input controls represents a condition for inclusion of the content 110 in the section of the client user interface 128. The administrative computing device 104 provides the selections 132 to the server system 102. The server system 102 may store the conditions 130 in the server data storage 112.

The client interface module 124 then receives a request 134 to present the client user interface 128 from the client computing device 106. The request for the client user interface 128 may include requesting an interface for a particular channel that curates content. In response to receiving the request 134, a content selection module 136 retrieves the conditions 130 for the channel from the server data storage 112. The content selection module 136 then applies the conditions 130 for the channel to the content 110 for the channel to select a subset 138 of the content 110 for display in a particular section of the client user interface 128.

In another implementation, the content selection module 136 may apply the conditions 130 to the content 110 to select the subset 138 prior to receiving the request 134. The content selection module 136 may then store the subset 138, for example, in the server data storage 112. The content selection module 136 may repeatedly apply the conditions 130 to the content 110 to update the selection of the subset 138 as new content is added or removed and/or as new actions are performed for the account. In one example, the content selection module 136 may periodically apply the conditions 130 to the content 110. In another example, the content selection module 136 may apply the conditions 130 to the content 110 in response to an event, such as the addition or removal of content and/or an action being performed on the content 110 for the account.

Using the subset 138 of the content 110 and the conditions 130, the client interface module 124 then generates the instructions 126 for presenting the client user interface 128. The client interface module 124 provides the instruction 126 and the subset 138 of the content 110 to the client computing device 106. In another example, the client interface module 124 may provide the instructions 126 to the client computing device 106 and then the client computing device 106 may use the instructions 126 to retrieve the subset 138 (or a portion of the subset 138) of the content 110 from the content hosting system 114. The client computing device 106 receives the subset 138 and presents the subset 138 in the corresponding section of the client user interface 128.

Figure 2:
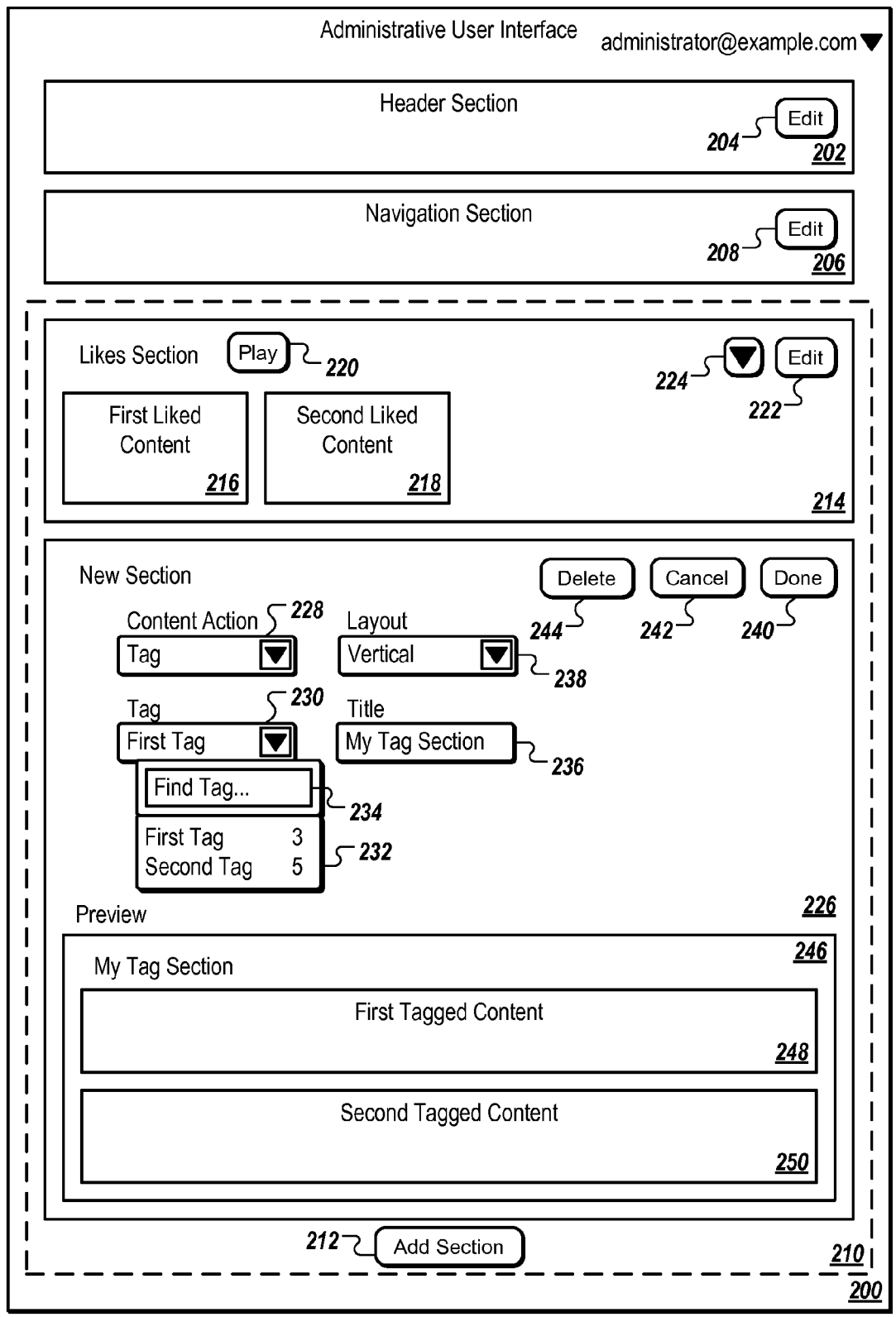
FIG. 2 is an example of an administrative user interface for selecting action-defined conditions for inclusion of curated content in a particular section of a client user interface.

FIG. 2 is an example of an administrative user interface 200 for selecting curated content for inclusion in a particular section of a client user interface. The administrative user interface 200 is a user interface for presenting content for a channel and also includes user input controls that allow an administrative user to edit settings for the channel, such as conditions for inclusion of the content in the user interface. To access the administrative user interface 200, the administrator may input login information, such as a username, a password, and/or a two-factor authentication code. The administrative user interface 200 may present an indication of the account that has been authenticated, such as by presenting username (e.g., administrator@example.com) within the administrative user interface 200.

The administrative user interface 200 includes a header section 202 that presents header information for the channel, such as a banner image, a channel icon, and/or links to other sites (e.g., a website for a corresponding business or a corresponding profile page on a social network). The header section 202 includes a header edit input control 204. The administrator can select the header edit input control 204 to edit settings for the header section 202. For example, in response to selection of the header edit input control 204, the administrative user interface 200 may present additional input controls, for example, to input the links to other sites and to upload or link to images for the banner image and the channel icon.

The administrative user interface 200 also includes a navigation section 206. The navigation section 206 presents input controls for navigating to various pages of the channel. A portion 210 of the administrative user interface 200 below the navigation section 206 may be switched to show particular content for the channel. For example, in response to user selection of the navigation controls, the administrative user interface 200 may update the portion 210 to present a discussion board for the channel, a feed of activity for the channel, a list of content uploaded to the channel, or a content browsing area with sections that the administrator of the channel may customize. The administrator may select a navigation edit input control 208 to edit settings for the navigation section 206. For example, in response to selection of the navigation edit input control 208, the administrative user interface 200 may present input controls that allow the administrator to choose which activity is presented in the feed and/or whether the content browsing area is the default displayed when users first visit the channel.

The administrative user interface 200 currently presents the content browsing area. The content browsing area includes one or more sections that present a subset of the content for the channel. The subset is selected based on conditions that are specified by the administrator using input controls in the administrative user interface 200. Each condition specifies at least one type of action that may be performed on the content for the channel, such as uploading content, adding content to or removing content from a playlist, adding a tag to or removing a tag from content, adding an indication of approval (e.g., a "like") to or removing an indication of approval from content, posting a comment to the discussion board or to content, or subscribing to or unsubscribing from another channel.

The content browsing area includes an add section input control 212. In response to the administrator selecting the add section input control 212, the administrative user interface 200 adds a new section to the content browsing area. The new section includes input controls that allow the administrator to specify the conditions for inclusion of content in the section. For example, the content browsing area currently includes a likes section 214. The likes section 214 presents content that the administrator account has "liked." The likes section 214 may include a first liked content 216 that the administrator account has uploaded to the channel and liked or a second liked content 218 that the administrator account has liked on another channel.

The administrator account has configured the likes section 214 to present the liked content in a horizontal orientation. In the case of video content, the liked content may initially present a thumbnail image from the video as well as other information, such as a name of the channel that uploaded the content, a title of the content, a number of views for the content, and/or a date the content was uploaded.

The likes section 214 includes a play control 220. A user may select the play control 220 to play the subset of content in the likes section 214. The likes section 214 also includes a likes edit control 222. In response to the administrator selecting the likes edit control 222, the administrative user interface 200 presents user input controls for editing the settings of the likes section 214. The likes section 214 further includes one or more likes order controls 224. In response to the administrator selecting the likes order controls 224, the administrative user interface 200 changes the order of the likes section 214 in the portion 210 by correspondingly moving the likes section 214 up or down within the content browsing area relative to other sections within the content browsing area.

In response to the administrator selecting the add section input control 212, the administrative user interface 200 adds a new section 226 to the content browsing area. The new section 226 includes a content action input control 228 that allows the administrator to select the type of action for the condition used to select the subset of content for the new section 226. The content action input control 228 may be, for example, a drop-down list input control that includes a list of the available types of actions. The list may include recent uploads, popular uploads, all playlists, likes, recent posts, recent activities, single playlist, and tag.

The type of action for the recent uploads condition includes the uploading of content to the channel by the administrator of the channel. The content selection module 136 selects a particular number of the most recent uploaded content for inclusion in a section that is based on the recent uploads condition.

The type of action for the recent posts condition includes the posting of playlists to the channel by the administrator of the channel. The content selection module 136 selects a particular number of the most recent posted playlists for inclusion in a section that is based on the recent posts condition.

The type of action for the recent activities condition includes the posting of playlists, liking of content, and uploading of content to the channel by the administrator of the channel. The content selection module 136 selects a particular number of the most recent activities for inclusion in a section that is based on the recent activities condition.

The popular uploads condition includes a combination of multiple types of actions. The first action is the uploading of content to the channel by the administrator of the channel. The other action includes one or more views of the content by other users of the server system 102. The content selection module 136 selects a particular number of the most popular uploaded content for inclusion in a section that is based on the popular uploads condition. The content selection module 136 may base the popularity on the number of views or the number of views within a particular period of time, such as the last day, week, or month.

The all playlists condition includes a combination of multiple types of actions. The first action is the creation or removal of a playlist to the channel by the administrator of the channel. The other action includes adding content to or removing content from the playlists. The content selection module 136 selects subsets of the content from the channel for each of the playlists for inclusion in a section that is based on the all playlists condition. The section presents a thumbnail for each playlist from the subset of content in the playlist as well as a list of the subset of the content in the playlist.

In response to the administrator selecting the single playlist condition in the content action input control 228, the administrative user interface 200 presents a playlist input control (not shown). The playlist input control allows the administrator to select the playlist for the section, such as by selecting from a drop-down list of the playlists for the channel. The type of action for the single playlist condition includes adding content to or removing content from the selected playlist. The content selection module 136 selects a subset of the content from the channel for the selected playlist for inclusion in a section that is based on the single playlist condition. The section presents the title of the playlist and thumbnails for each content item in the playlist. The section may also present other information for the content items, such as a name of the channel that uploaded the content, a title of the content, a number of views for the content, and/or a date the content was uploaded.

In response to the administrator selecting the tag condition in the content action input control 228, the administrative user interface 200 presents a tag input control 230. The tag input control 230 allows the administrator to select the tag for the new section 226, such as by selecting from a drop-down list 232 of the tags for the channel. The drop-down list 232 may present for each tag a number of content items having the tag. The drop-down list 232 may include a text input control 234. In response to the administrator inputting text in the text input control 234, the administrative user interface 200 filters the list of tags in the drop-down list 232 based on the text. The new section 226 also includes a title input control 236 in which the administrator may input text for use as a title of the new section 226. The type of action for the tag condition includes adding the tag to or removing the tag from content. The content selection module 136 selects a subset of the content from the channel for the selected tag for inclusion in a section that is based on the tag condition.

In general, the edit mode for each section may include a layout input control 238. The layout input control 238 may include a drop-down list that includes items that allow the administrator to select either a horizontal or a vertical layout for the items presented in the section. The edit mode for each section may also include a done input control 240, a cancel input control 242, and a delete input control 244. The administrative user interface 200 may remove a section in response to the administrator selecting the delete input control 244. The administrative user interface 200 may exit edit mode without saving any changes in response to the administrator selecting the cancel input control 242. The administrative user interface 200 may exit edit mode and save any changes in response to the administrator selecting the done input control 242.

The edit mode for each section may include a preview area 248 that shows a preview of the section as presented to a non-administrator user. The preview area 248 may include a title of the section, such as the title entered in the title input control 236 or a default title for the section. The preview area 248 also presents the subset of the content selected by the content selection module 136. The preview area 248 for the new section 226 includes a first tagged content 248 and a second tagged content 250 that both have the tag "First Tag." The administrator has selected "Vertical" in the layout input control 238. Accordingly, the administrative user interface 200 presents the first tagged content 248 and the second tagged content 250 in a vertical list.

Upon exiting edit mode for a section, the administrative user interface 200 may cease to display any input controls for the section. The administrative user interface 200 may begin displaying the edit input control 222, which allows the administrator to return to edit mode for the section. Upon exiting edit mode, the administrative user interface 200 also displays the subset of the content for the section. The subset is responsive to the selected condition for the section and any actions performed on the content by the administrator or other users within the types of action for the conditions.

Figure 3:
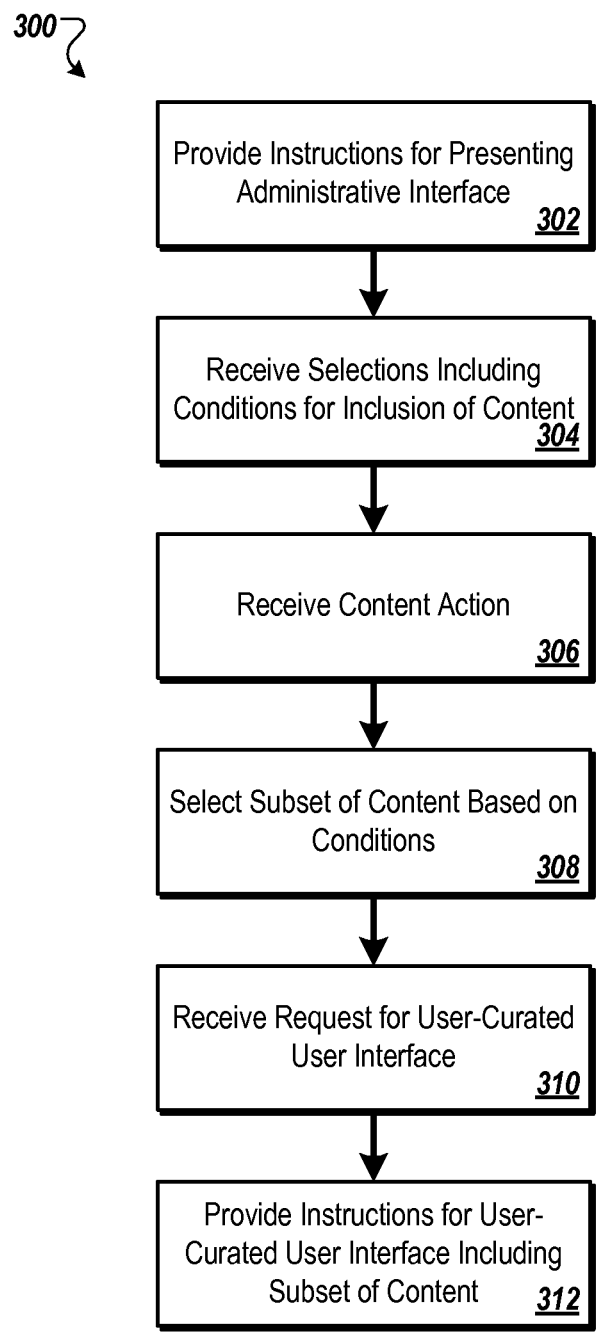
FIG. 3 is flow chart that shows an example of a process for selecting curated content for inclusion in a particular section of a user interface based on action-defined conditions.

FIG. 3 is a flow chart that shows an example of a process 300 for selecting content for inclusion in a particular section of a curated user interface. The process 300 may be performed, for example, by a system such as the system 100 and the administrative user interface 200. For clarity of presentation, the description that follows uses the system 100 and the administrative user interface 200 as examples for describing the process 300. However, another system, or combination of systems, may be used to perform the process 300.

The process 300 begins, at block 302, with providing instructions to an administrative device for presenting an administrative interface. The instructions may be provided, for example, in response to a request from a browser application for a web page that includes the administrative interface or in response to a request from a stand-alone application for the instructions. In some implementations, an administrative user may initiate the request for the web page from the browser application or the request for the instructions from the stand-alone application. The administrative interface includes user input controls for selecting conditions for inclusion of content in a section of a user-curated user interface. For example, the administrative interface module 118 may provide the instructions 120 for the administrative user interface 122 to the administrative computing device 104.

At block 304, the process 300 includes receiving one or more selections of the user input controls from the administrative device. The selections include the conditions for inclusion of content in the section of the user-curated user interface. Each of the conditions includes at least one type of action requested by an account associated with the user-curated user interface. For example, the administrator may make user inputs within the administrative user interface 122 that select conditions for inclusion of content within the sections of the client user interface 128. The administrative computing device 104 may then provide the selections to the server system 102.

At block 306, the process 300 includes receiving one or more actions to be performed on the content. For example, the administrator at the administrative computing device 104 may upload content to or remove content from the channel, create or remove a playlist, add content to or remove content from a playlist, add a tag to or remove a tag from content, like or unlike content, and create or remove a tag from content. The server system 102 may store the actions and/or updates to the content 110 in the server data storage 112.

At block 308, the process 300 includes selecting, at a server system, a subset of the content for inclusion in the section of the user-curated user interface based on the conditions and the type of action. For example, the content selection module 136 may select the subsets of the content for the sections of the client user interface 128 and/or the previews in the administrative user interface 122 based on the results of the received actions.

In one example, the subset of the content includes a playlist of content and the type of action for one of the conditions includes adding content to the playlist. In a further example, the subset of the content includes content with a particular tag and the type of action for one of the conditions includes tagging content with the particular tag. In yet another example, the subset of the content includes content uploaded to the account and the type of action for one of the conditions includes uploading content to the account.

In some implementations, the action for a condition in the conditions includes multiple actions. For example, the condition may apply a union of the actions. The union may include an inclusive disjunction (e.g., an inclusive "or" logical operation), such as content that is in either a first playlist or a second playlist, or in either a particular tag or a particular playlist. In another example, the condition may apply an intersection of the actions. The intersection may include an exclusive disjunction (e.g., an exclusive "or" logical operation), such as content that is in both a first tag and a second tag, or in both a particular tag and a particular playlist.

At block 310, the process 300 includes receiving a request for the user-curated user interface from a client device. For example, the client computing device 106 may send the request 134 for the client user interface 128 to the server system 102.

In some implementations, selecting the subset may be performed after receiving the request. Alternatively, selecting the subset may be performed before receiving the request and after receiving an identification of new content for the user-curated user interface.

At block 312, the process 300 includes providing instructions to the client device for presenting the user-curated user interface. The user-curated user interface includes the subset of the content in the section of the user-curated user interface. For example, the client interface module 124 may provide the instructions 126 to the client computing device 106 for presenting the client user interface 128 and the subset 138 of the content 110.

Figure 4:
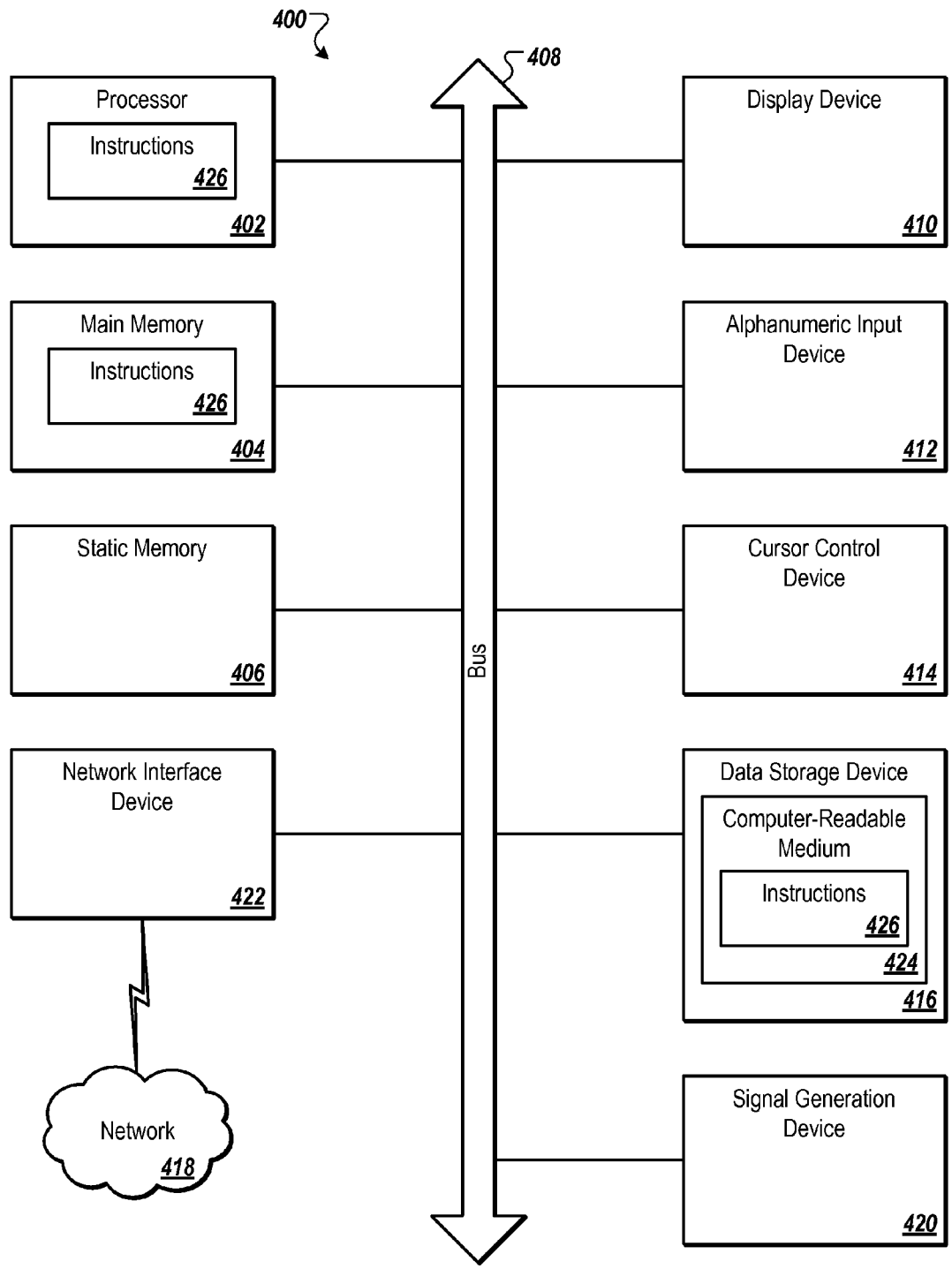
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC)

microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the server system 102, the administrative computing device 104, the client computing device 106, and/or the content hosting system 114 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the server system 102, the administrative computing device 104, the client computing device 106, and/or the content hosting system 114 embodying any one or more of the methodologies or functions described herein. The sets of instructions 426 of the server system 102, the administrative computing device 104, the client computing device 106, and/or the content hosting system 114 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying," "providing," "enabling," "finding," "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
providing instructions to an administrative device for presenting an administrative interface, wherein the administrative interface comprises user input controls for selecting conditions for inclusion of content in a section of a user-curated user interface;
receiving one or more selections of the user input controls from the administrative device, wherein the selections comprise the conditions for inclusion of content in the section of the user-curated user interface, and wherein each of the conditions comprises at least one type of action requested by an account associated with the user-curated user interface;
receiving a request for the user-curated user interface from a client device;
selecting, by a processing device of a server system, a subset of the content for inclusion in the section of the user-curated user interface based on the conditions and the type of action, wherein the selection of each content item in the subset is further based on having received an action performed on the content item that has the type of action for at least one of the conditions; and
providing instructions to the client device for presenting the user-curated user interface, wherein the user-curated user interface comprises the subset of the content in the section of the user-curated user interface.

2. The method of claim 1, wherein selecting the subset is performed after receiving the request.

3. The method of claim 1, wherein selecting the subset is performed before receiving the request.

4. The method of claim 1, wherein the subset of the content comprises a playlist of content and the type of action for at least one of the conditions comprises adding content to the playlist.

5. The method of claim 1, wherein the subset of the content comprises content with a particular tag and the type of action for at least one of the conditions comprises tagging content with the particular tag.

6. The method of claim 1, wherein the subset of the content comprises content uploaded to the account and the type of action for at least one of the conditions comprises uploading content to the account.

7. The method of claim 1, wherein the action for a condition in the conditions comprises multiple actions, and wherein the condition applies a union of the actions.

8. The method of claim 1, wherein the action for a condition in the conditions comprises multiple actions, and wherein the condition applies an intersection of the actions.

9. A non-transitory computer-readable medium having instructions stored thereon, which when executed by a processing device, cause the processing device to perform operations comprising:
providing instructions to an administrative device for presenting an administrative interface, wherein the administrative interface comprises user input controls for selecting conditions for inclusion of content in a section of a user-curated user interface;
receiving one or more selections of the user input controls from the administrative device, wherein the selections comprise the conditions for inclusion of content in the section of the user-curated user interface, and wherein each of the conditions comprises at least one type of action requested by an account associated with the user-curated user interface;
receiving a request for the user-curated user interface from a client device;
selecting, by the processing device of a server system, a subset of the content for inclusion in the section of the user-curated user interface based on the conditions and the type of action, wherein the selection of each content item in the subset is further based on having received an action performed on the content item that has the type of action for at least one of the conditions; and
providing instructions to the client device for presenting the user-curated user interface, wherein the user-curated user interface comprises the subset of the content in the section of the user-curated user interface.

10. The non-transitory computer-readable medium of claim 9, wherein selecting the subset is performed before receiving the request.

11. The non-transitory computer-readable medium of claim 9, wherein the action for a condition in the conditions comprises multiple actions, and wherein the condition applies a union of the actions.

12. The non-transitory computer-readable medium of claim 9, wherein the action for a condition in the conditions comprises multiple actions, and wherein the condition applies an intersection of the actions.

13. A system comprising:
at least one interface to:
receive one or more selections of user input controls from an administrative device, wherein the selections comprise conditions for inclusion of content in a section of a user-curated user interface, and wherein each of the conditions comprises at least one type of action requested by an account associated with the user-curated user interface, and
receive a request for the user-curated user interface from a client device; and
at least one processing device to:
provide an administrative interface for display at the administrative device, wherein the administrative interface comprises the user input controls,
select a subset of the content for inclusion in the section of the user-curated user interface based on the conditions and the type of action, wherein the selection of each content item in the subset is further based on receipt of an action performed on the content item that has the type of action for at least one of the conditions, and
provide instructions to the client device for presenting the user-curated user interface comprising the subset of the content in the section of the user-curated user interface.

14. The system of claim 13, wherein the processing device is further to select the subset after receipt of the request.

15. The system of claim 13, wherein the processing device is further to select the subset before receipt of the request.

16. The system of claim 13, wherein the subset of the content comprises a playlist of content and the type of action for at least one of the conditions comprises adding content to the playlist.

17. The system of claim 13, wherein the subset of the content comprises content with a particular tag and the type of action for at least one of the conditions comprises tagging content with the particular tag.

18. The system of claim 13, wherein the subset of the content comprises content uploaded to the account and the type of action for at least one of the conditions comprises uploading content to the account.

19. The system of claim 13, wherein the action for a condition in the conditions comprises multiple actions, and wherein the condition applies a union of the actions.

20. The system of claim 13, wherein the action for a condition in the conditions comprises multiple actions, and wherein the condition applies an intersection of the actions.

* * * * *